United States Patent [19]

Morris

[11] Patent Number: 4,889,356

[45] Date of Patent: Dec. 26, 1989

[54] TRAILER HITCH BALL ASSEMBLY

[76] Inventor: Francis E. Morris, 1706 Cherry St., Wausau, Wis. 54401

[21] Appl. No.: 296,013

[22] Filed: Jan. 12, 1989

[51] Int. Cl.$^4$ .............................................. B60D 1/06
[52] U.S. Cl. .................................. 280/416.1; 280/504; 280/511; 403/131; 403/328
[58] Field of Search ............ 280/511, 507, 504, 516.1, 280/415.1, 416.1; 403/131, 328, 3; 411/348; 285/271

[56] References Cited

U.S. PATENT DOCUMENTS

| | | | |
|---|---|---|---|
| 2,297,182 | 9/1942 | Weiss | 280/511 |
| 4,433,854 | 2/1984 | Smith | 280/511 |
| 4,483,638 | 11/1984 | Marie et al. | 403/328 X |

FOREIGN PATENT DOCUMENTS 1035152  4/1953  France .................. 280/511

OTHER PUBLICATIONS

1988 Draw-Title Catalog, p. 42, Convert-A-Ball Brochure.

Primary Examiner—Mitchell J. Hill
Attorney, Agent, or Firm—James L. Kirschnik

[57] ABSTRACT

A trailer hitch ball assembly includes a vertical post for attachment to a vehicle drawbar. The post has a smooth cylindrical upper portion and a circumferential retainer groove for receiving and retaining a ball while permitting rotation of the ball. The ball includes a central bore which receives the post upper portion and a retainer screw for engaging the retainer groove. A threaded lower portion and two nuts are utilized to secure the post on the drawbar. The threaded portion may include an exposed free portion for storing a replacement ball of the same or different diameter.

9 Claims, 1 Drawing Sheet

TRAILER HITCH BALL ASSEMBLY

CROSS REFERENCE TO RELATED APPLICATIONS

This invention relates to a device as disclosed in my disclosure document dated Dec. 18, 1987 and filed with the Commissioner of Patents on Dec. 24, 1987 as Disclosure Document Number 183925.

BACKGROUND OF THE INVENTION

1. Field of the Invention

This invention relates to trailer hitch balls adapted to be attached to a vehicle for towing a trailer, and more particularly to a device adapted to provide for easy substitution of balls of different sizes.

2. DESCRIPTION OF PRIOR ART

Trailer hitch balls for towing trailers by vehicles have been used for many years. Such balls typically are attached to a drawbar at the rear of a vehicle and are inserted into a socket attached to the trailer to be towed. Depending upon the capacity of the trailer and the load to be pulled by the vehicle itself, various diameter sizes of balls have been and are commonly used. To accommodate different size sockets, a different ball assembly on the towing vehicle was required. Attempts have also been made to provide ball assemblies with interchangeable balls of different diameters adapted to be placed on a single upstanding post attached to the vehicle drawbar. The present invention improves on the concept of substituting different ball sizes on a common post attached to a vehicle drawbar.

SUMMARY OF THE INVENTION

It is an object of the present invention to provide a trailer hitch ball assembly which may selectively utilize different diameter balls.

A further object of the invention is to provide a trailer hitch ball assembly where the ball portion is rotatably mounted on a post to prevent seizing and to reduce wear and friction between the ball and trailer socket when the two vehicle turns or otherwise pulls the trailer.

Another object of the invention is to provide a trailer hitch ball assembly where an alternate ball size may be attached directly to the assembly when not in use for storage and easy accessibility.

The objects and advantages of the invention are provided by using a vertical cylindrical post having an upstanding portion for receiving a ball. The ball has a vertical central bore to receive the post, and a horizontally extending retaining screw or pin. The post includes a horizontal groove around the post circumference for receiving the retaining screw and retaining the ball axially in place while permitting the ball to rotate on the post itself. The post includes a downwardly extending threaded portion adapted to be affixed by conventional nuts and washers to a vehicle drawbar, and the threaded portion may be extended sufficiently downward to permit the storage of different sized balls at its lower reaches by placing the retaining screw in a depressed groove formed within the threaded portion.

DESCRIPTION OF A PREFERRED EMBODIMENT

Figure 1:
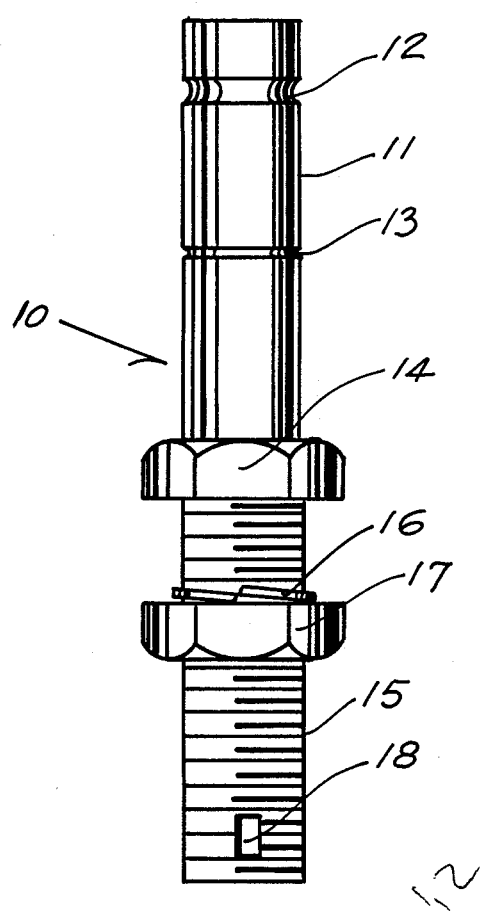
FIG. 1 is an elevation view of a trailer hitch post according to the invention.

Referring to FIG. 1, a hitch post 10 includes a smooth cylindrical portion 11 which has a generally horizontal circumferential retainer groove 12 spaced downward from the top and a parallel circumferential snap ring groove 13 spaced downwardly from the retainer groove 12. A base nut 14 is provided adjacent the bottom of the smooth cylindrical portion 11 and is threaded onto a downwardly extending threaded section 15 of post 10. A lock washer 16 and retainer nut 17 are also provided, and a rectangular groove 18 extending parallel to the central axis of the post assembly is formed in the lower portion of threaded section 15.

Figure 2:
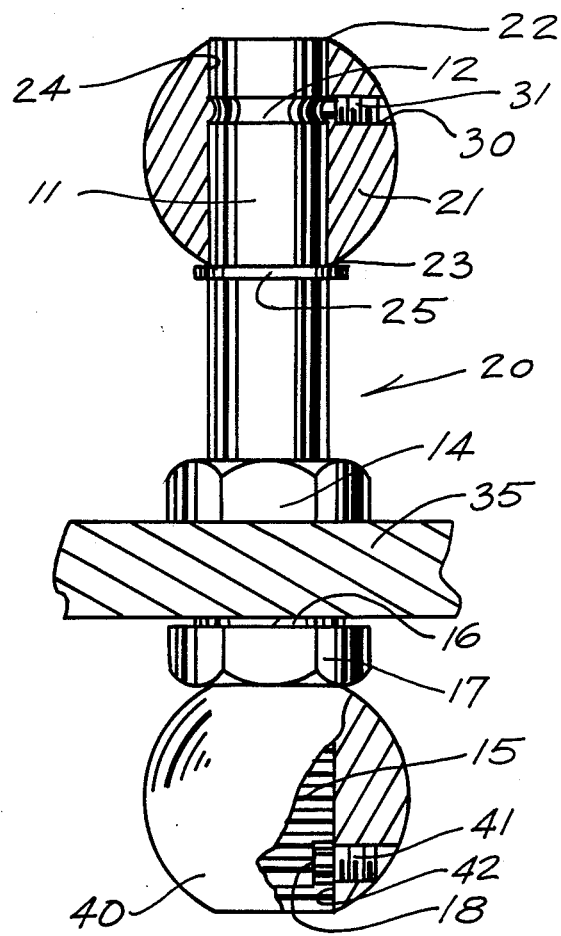
FIG. 2 is an elevation view in partial section of a preferred embodiment of a trailer hitch ball assembly according to the invention.

Referring to FIG. 2, a hitch ball assembly 20 is shown in which a hitch ball 21 comprises a spherical zone having parallel upper and lower base portions 22 and 23 respectively and including a central vertical bore 24 sized to fit around the upper cylindrical post portion 11. The lower base 23 is supported on a retainer snap ring 25 contained within the snap ring groove 13. The ball 21 includes a threaded horizontal opening 30 in which a conventional retainer screw 31 is placed with its central axis positioned to align with the retainer groove 12. Thus as shown in FIG. 2, the retainer screw 31 may be withdrawn from the interior of the bore 24 to permit the ball 21 to be placed onto the post 11. When the ball 21 is in place, the retainer screw 31 is turned to insert the end of the screw 31 within retainer groove 12 and thereby retain the ball 21 axially in place on the post 11. The circumferential retainer groove 12 will permit rotation of the ball 21 around the central axis of the hitch post 11 as long as the retainer screw 31 is not turned in too far The base nut 14 is supported on the upper surface of a drawbar 35 (shown in part) which would be attached to the towing vehicle in any conventional manner and which would include a bore, not shown, for receiving the threaded section 15 of post assembly 10. Base nut 14 is simply turned up the threaded portion 15 to the end of the threads and torqued in place. The lower nut 17 and lock washer 16 are tightened to secure the post assembly 10 in place on the drawbar 35. Use of a base nut 14 with lower nut 17 provides for convenient securing of the hitch post with two wrenches to hold one nut while tightening the other. As is also shown in FIG. 2, a second hitch ball 40 may be secured at the bottom of the threaded portion 15 by means of screw 41 which is turned to engage the groove 18 formed in the threaded portion 15. The ball 40 also has a central bore 42 sized to fit over the threaded portion 15.

As will be appreciated by those skilled in the art, hitch ball 21 may be, by way of example, a standard 2 inch (5.08 cm.) diameter sphere while the lower ball 40 could be any other size such as a 2 5/16 "inch (5.87 cm.) diameter ball stored for future use on the threaded portion 15 of hitch post assembly 10 after it is installed on the drawbar 35 of a vehicle. The upper ball 21 is thus used for towing a particular trailer having a mating socket for a 2 inch ball size. If the user desires to pull a trailer having a larger socket, the lower ball 40 is simply removed by unscrewing the retaining screw 41 to remove it while the upper ball 21 is similarly removed. The lower ball 40 then may be replaced at the top of the assembly and retained in place and the upper ball 21 stored at the lower end of the assembly as described.

The invention thus provides for a convenient and quick method of changing the ball size on a trailer hitch assembly. It also permits the convenient storage of an alternate size ball when not in use. The hitch post assembly can remain in place on the vehicle once installed. A further advantage of the invention is the provision that the balls may rotate around the upper post thereby reducing wear and friction while pulling a trailer. Providing rotation of the ball also prevents seizing between the ball and socket from loosening the assembly. In addition a grease port and fitting could be included to lubricate the post-ball interface. Those skilled in the art will appreciate that the materials for constructing the invention would comprise any suitable strength steel, or other material, preferably of the corrosion resistant variety. Snap ring 25 could also be steel, plastic, nylon, or another suitable material.

Figure 3:
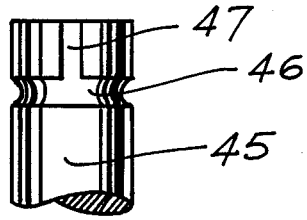
FIG. 3 is a partial elevation view of a portion of an alternate hitch post configuration; and, FIG. 4 is a sectional view of an alternate hitch ball.

An alternate version of the hitch post is shown in FIG. 3 where the upper cylindrical portion 45 has a circumferential retainer groove 46 and a groove 47 extending from the top of the post 45 downward into the groove 46. This provision would enable the retainer pin or screw previously described to be fixed and permit a ball with such a fixed pin to be positioned to align the pin with the groove 47 sliding it downward into contact with groove 46 and turned to retain the ball in place. This configuration would eliminate the need for a screw type retainer, but would have the disadvantage of not easily permitting storage at the bottom threaded portion 15 as previously described.

Figure 4:
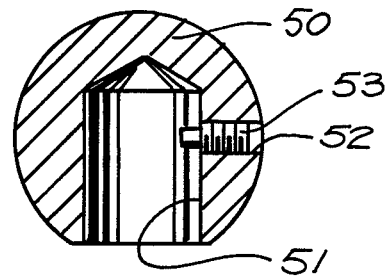

FIG. 4 shows an alternate configuration of a ball 50 having a central bore 51 which is not drilled entirely through the ball. A horizontal threaded bore 52 and retainer screw 53 is also shown as in the other versions. The configuration shown in FIG. 4 would eliminate the need for a snap ring groove 13 and snap ring 25, as the depth of the bore 21 could be such to permit the ball 50 to rest on top of the hitch post 10 and dimensioned to align the retainer screw 53 with the retainer groove 12.

From the foregoing, it will be appreciated by those skilled in the art that other configurations and variations of the invention are possible. While one preferred embodiment of the invention has thus been described, and has been addressed to trailer hitches, the inventive concept may find application in other areas where a socket and ball arrangement is utilized for some purpose. The scope of the invention is thus to be taken solely from the claims which follow.

I claim:

1. A trailer hitch ball assembly adapted to be attached to a vehicle drawbar for towing a trailer, said assembly comprising:
   a. cylindrical post means having an a top end and a smooth upper portion for receiving and supporting a substantially spherical ball and a threaded lower portion;
   b. said smooth upper portion having a circumferential retainer groove formed therein;
   c. a substantially spherical ball having a central bore formed therein for engaging said upper portion;
   d. retainer means in said ball for selectively engaging said retainer groove to retain said ball on said upper portion while permitting rotation of said ball on said upper portion;
   e. nut means for securing said threaded portion of said post on said vehicle drawbar;
   f. said post means including a second circumferential groove formed in said upper portion and spaced beneath said retainer groove; and,
   g. snap ring means for engaging said second groove for supporting said ball when in place on said post.

2. A hitch ball assembly as set forth in claim 1 wherein said retainer means includes a threaded aperture formed in said ball, and a threaded retainer screw which may be advanced or retracted within said threaded aperture to selectively place a portion of said screw within said retainer groove.

3. A hitch ball assembly as set forth in claim 2 wherein said threaded lower portion of said post includes peripheral groove means formed therein for being selectively engaged by the retainer means of said ball for storing said ball when not in use.

4. A hitch ball assembly as set forth in claim 3 wherein said upper portion of said post includes a generally axially extending groove formed therein and extending from the top end of said post to said retainer groove.

5. A hitch ball assembly as set forth in claim 4 wherein said nut means includes a first nut adapted to be threaded onto said post threaded lower portion and a second nut for securing said post on said drawbar with said drawbar between said first and second nuts.

6. A hitch ball assembly as set forth in claim 1 wherein said retainer means includes a threaded aperture formed in said ball, and a threaded retainer screw which may be advanced or retracted within said threaded aperture to selectively place a portion of said screw within said retainer groove.

7. A hitch ball assembly as set forth in claim 1 wherein said nut means includes a first nut adapted to be threaded onto said post threaded lower portion and a second nut for securing said post on said drawbar with said drawbar between said first and second nuts.

8. A trailer hitch ball assembly adapted to be attached to a vehicle drawbar for towing a trailer, said assembly comprising:
   a. cylindrical post means having an a top end and a smooth upper portion for receiving and supporting a substantially spherical ball and a threaded lower portion;
   b. said smooth upper portion having a circumferential retainer groove formed therein;
   c. a substantially spherical ball having a central bore formed therein for engaging said upper portion;
   d. retainer means in said ball for selectively engaging said retainer groove to retain said ball on said upper portion while permitting rotation of said ball on said upper portion;
   e. nut means for securing said threaded portion of said post on said vehicle drawbar; and,
   f. said threaded lower portion of said post including peripheral groove means formed therein for being selectively engaged by the retainer means of said ball for storing said ball when not in use.

9. A trailer hitch ball assembly adapted to be attached to a vehicle drawbar for towing a trailer, said assembly comprising:
   a. cylindrical post means having an a top end and a smooth upper portion for receiving and supporting a substantially spherical ball and a threaded lower portion;

b. said smooth upper portion having a circumferential retainer groove formed therein;

c. a substantially spherical ball having a central bore formed therein for engaging said upper portion;

d. retainer means in said ball for selectively engaging said retainer groove to retain said ball on said upper portion while permitting rotation of said ball on said upper portion;

e. nut means for securing said threaded portion of said post on said vehicle drawbar; and, f. said upper portion of said post including a generally axially extending groove formed therein and extending from the top of said post to said retainer groove.

* * * * *